(12) United States Patent
Kuroki et al.

(10) Patent No.: US 8,148,469 B2
(45) Date of Patent: Apr. 3, 2012

(54) FIBER REINFORCED PLASTIC MOLDING MATERIAL AND FIBER REINFORCED PLASTIC MOLDED ARTICLE

(75) Inventors: Kunihiro Kuroki, Isesaki (JP); Naoki Ootsu, Isesaki (JP)

(73) Assignee: Showa Denko K.K., Tokyo (JP)

( * ) Notice: Subject to any disclaimer, the term of this patent is extended or adjusted under 35 U.S.C. 154(b) by 118 days.

(21) Appl. No.: 12/599,750

(22) PCT Filed: May 14, 2007

(86) PCT No.: PCT/JP2007/059853
§ 371 (c)(1),
(2), (4) Date: Nov. 11, 2009

(87) PCT Pub. No.: WO2008/139602
PCT Pub. Date: Nov. 20, 2008

(65) Prior Publication Data
US 2010/0311887 A1    Dec. 9, 2010

(51) Int. Cl.
*C08J 5/24* (2006.01)
*C08L 101/16* (2006.01)
*C08K 13/08* (2006.01)

(52) U.S. Cl. ........................ 525/131; 525/127

(58) Field of Classification Search .................. 525/131, 525/127
See application file for complete search history.

(56) References Cited

U.S. PATENT DOCUMENTS
4,824,919 A    4/1989 Baker et al.

FOREIGN PATENT DOCUMENTS

| | | | |
|---|---|---|---|
| JP | 60-248771 A | | 12/1985 |
| JP | 62-292839 A | | 12/1987 |
| JP | 62292839 A | * | 12/1987 |
| JP | 02-120312 A | | 5/1990 |
| JP | 02120312 A | * | 5/1990 |
| JP | 2004-263025 A | | 9/2004 |
| JP | 2004263025 A | * | 9/2004 |
| JP | 2006-290640 A | | 10/2006 |
| JP | 2006290640 A | * | 10/2006 |
| WO | 9810004 A | | 3/1998 |
| WO | 9922195 A1 | | 5/1999 |

* cited by examiner

*Primary Examiner* — Kelechi Egwim
(74) *Attorney, Agent, or Firm* — Sughrue Mion, PLLC

(57) ABSTRACT

Provided is a fiber reinforced plastic molding material which provides a cured product with excellent impact resistance, corrosion resistance and transparency. The fiber reinforced plastic molding material includes: a radical polymerizable resin composition containing: a vinyl ester resin (A) having a weight average molecular weight of 500 to 6,000; a urethane (meth)acrylate resin (B) obtained by reacting an isocyanate compound having two or more isocyanate groups in one molecule, a (meth)acrylic compound having one or more hydroxyl groups in one molecule and polyethylene glycol; an aliphatic amine (C) represented by the following general formula:

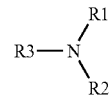

where R1 represents a hydroxyalkyl group, R2 represents an alkyl group or a hydroxyalkyl group, and R3 represents H or $CH_3$; a metal soap of cobalt (D); and an organic peroxide (E); and a glass fiber reinforcing material (F).

8 Claims, No Drawings

FIBER REINFORCED PLASTIC MOLDING MATERIAL AND FIBER REINFORCED PLASTIC MOLDED ARTICLE

TECHNICAL FIELD

The present invention relates to a fiber reinforced plastic molding material and a fiber reinforced plastic molded article. More specifically, the present invention relates to a fiber reinforced plastic molding material used for a fiber reinforced plastic molded article (FRP molded article) which requires corrosion resistance, transparency, and impact resistance, such as a pressure container.

BACKGROUND ART

In general, radical polymerizable resins typified by unsaturated polyester resins, vinyl ester resins, urethane (meth) acrylic resins, polyester (meth)acrylate resins, (meth)acrylate resins, etc., are materials that provide cured products excellent in mechanical strength, water resistance, etc. As such radical polymerizable resins have a curing time period that can be adjusted without being influenced by atmospheric temperature by adjusting a curing agent or an accelerator. Therefore, unlike epoxy resins, curing thereof does not take a long period of time and poor curing does not occur when the resins are treated especially at low temperatures. For this reason, the radical polymerizable resins have been conventionally widely used in coating materials, adhesives, fiber reinforced plastic molding materials, etc.

Among the radical polymerizable resins, vinyl ester resins provide cured products with excellent acid and alkali resistance, and cold curing properties. Hence they are widely used for various applications, for example, FRP molded articles such as corrosion resistant tanks and corrosion-proof FRP linings. Moreover, cured products obtained from the vinyl ester resins are transparent. Therefore, when the cured products are used for containers such as tanks, there is the merit that the remaining amount of liquid or the like in the container can be easily confirmed.

However, since containers such as tanks manufactured using the vinyl ester resins do not have enough toughness (impact resistance) to be able to withstand pressures such as internal or external pressures and impact from the outside, there is a problem in that cracking due to pressure or impact occurs.

On the other hand, in order to increase the impact resistance of the cured products, various studies have been made. For example, a resin composition containing an epoxy vinyl ester resin, a urethane vinyl ester resin, and a coreactive monomer such as styrene is known (e.g., see Patent Document 1). In such a resin composition as described above, the impact resistance is improved using a second phase in which the urethane vinyl ester resin is formed by dispersion (i.e., microphase separated) in the epoxy vinyl ester resin at the time of curing.

However, such a resin composition as described above has a problem in that a transparent cured product cannot be obtained because of the turbidity resulting from microphase separation, which occurs at the time of curing.

Further, methacrylic resins obtained by copolymerization of methyl methacrylate and a specific compound (e.g., see Patent Document 2), and resin compositions containing an acid modified epoxy acrylate which is obtained by adding polybasic acid anhydride to a part or a whole of a hydroxy group present in epoxy acrylate, a thermoplastic polymer, a compound having two or more double bonds in one molecule, and a reactive monomer having a single double bond in one molecule (e.g., see Patent Document 3) are also known.

Molding materials which contain such resins and such resin compositions can provide transparent cured products excellent in impact resistance, however they have problems in that the cured products have insufficient corrosion resistance, and thus cannot be used for containers such as tanks which require corrosion resistance.

As described above, molding materials containing the conventional resins or resin compositions do not successfully provide cured products with excellent impact resistance, corrosion resistance and transparency.

Patent Document 1: JP 2001-500177 A
Patent Document 2: JP 2003-128729 A
Patent Document 3: JP 2002-138121 A

DISCLOSURE OF THE INVENTION

Problems to be Solved by the Invention

The present invention has been made in order to solve the above-mentioned problems, and has an object of providing a fiber reinforced plastic molding material which provides a cured product with excellent impact resistance, corrosion resistance and transparency.

Means for Solving the Problems

The present invention provides a fiber reinforced plastic molding material, including: a radical polymerizable resin composition containing: a vinyl ester resin (A) having a weight average molecular weight of 500 to 6,000; a urethane (meth)acrylic resin (B) obtained by reacting an isocyanate compound having two or more isocyanate groups in one molecule, a (meth)acrylic compound having one or more hydroxy groups in one molecule, and polyethylene glycol; an aliphatic amine (C) represented by the following general formula:

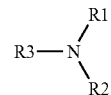

where R1 represents a hydroxyalkyl group, R2 represents an alkyl group or a hydroxyalkyl group, and R3 represents H or CH$_3$; a metal soap of cobalt (D); and an organic peroxide (E); and a glass fiber reinforcing material (F).

In addition, the present invention provides a fiber reinforced plastic molded article, which is formed by curing the above-mentioned fiber reinforced plastic molding material.

Effects of the Invention

The present invention can provide a fiber reinforced plastic molding material which can furnish the cured products with excellent impact resistance, corrosion resistance and transparency.

BEST MODE FOR CARRYING OUT THE INVENTION

The fiber reinforced plastic molding material of the present invention contains a radical polymerizable resin composition containing a vinyl ester resin (A) having a given weight average molecular weight, a given urethane (meth)acrylic resin (B), an aliphatic amine (C) represented by a given general formula, a metal soap of cobalt (D), and an organic peroxide (E), and a glass fiber reinforcing material (F).

The vinyl ester resin (A) used in the present invention is generally a resin obtained by dissolving, in a radical polymerizable unsaturated monomer, a compound (vinyl ester) having a polymerizable unsaturated bond and obtained by a ring opening reaction of a compound containing a glycidyl group (epoxy group) and a carboxyl compound having a polymerizable unsaturated bond, such as acrylic acid. Such a vinyl ester resin (A) is described in, for example, "Polyester resin handbook" (Nikkan Kogyo Shimbun, Ltd., published in 1988) or "Toryo Yogo Jiten" (edited by Sikizai Kyokai, published in 1993).

Such a vinyl ester resin (A) has a weight average molecular weight of 500 to 6,000, and preferably 1,000 to 5,000. When the weight average molecular weight of the vinyl ester resin (A) is lower than 500, strength sufficient for practical use cannot be obtained. Thus, such a weight average molecular weight is not preferable. In contrast, when the weight average molecular weight exceeds 6,000, the desired workability and storage stability cannot be obtained. Thus, such a weight average molecular weight is not preferable.

The vinyl ester used as a raw material of the vinyl ester resin (A) is not particularly limited, and is produced by known methods. In particular, the vinyl ester is epoxy (meth)acrylate obtained by reacting unsaturated monobasic acid, e.g., acrylic acid or methacrylic acid, with an epoxy resin.

Examples of the epoxy resin include aliphatic glycidylethers such as bisphenol A diglycidyl ether and high molecular weight homologues thereof; novolac polyglycidyl ether and high molecular weight homologues thereof; and 1,6 hexanediol diglycidyl ether. Among them, the bisphenol A epoxy resin, the novolac poly glycidylethers, and bromides thereof are preferable from the viewpoint of toughness. Moreover, from the viewpoint of imparting flexibility, saturated dibasic acids such as adipic acid, sebacic acid, and dimer acid may be reacted with the epoxy resin.

The radical polymerizable unsaturated monomer used as a raw material for the vinyl ester resin (A) is not particularly limited, and conventionally known monomers may be used. Examples of the radical polymerizable unsaturated monomer include: styrene-based monomers such as a styrene monomer, α-, o-, m-, and p-alkyl, nitro, cyano, amide, ester derivatives of styrene, chlorstyrene, vinyltoluene, and divinylbenzene; dienes such as butadiene, 2,3-dimethylbutadiene, isoprene, and chloroprene; (meth)acrylates such as ethyl (meth)acrylate, methyl (meth)acrylate, n-propyl (meth)acrylate, i-propyl (meth)acrylate, hexyl (meth)acrylate, 2-ethylhexyl (meth)acrylate, lauryl (meth)acrylate, dodecyl (meth)acrylate, cyclopentyl (meth)acrylate, cyclohexyl (meth)acrylate, tetrahydrofuryl (meth)acrylate, acetoacetoxy ethyl (meth)acrylate, dicyclopentenyloxyethyl (meth)acrylate, and phenoxyethyl (meth)acrylate; (meth)acrylic acid amides such as (meth)acrylic acid amide and N,N-dimethyl (meth) acrylic acid amide; vinyl compounds such as (meth)acrylic acid anilide; unsaturated dicarboxylic acid diesters such as diethyl citraconic acid; monomaleimide compounds such as N-phenyl maleimide; and N-(meth)acryloyl phthalimide. In addition, (meth)acrylic acid esters each having two or more (meth)acryloyl groups in one molecule such as ethylene glycol di(meth)acrylate, diethylene glycol di(meth)acrylate, triethylene glycol di(meth)acrylate, polyethylene glycol di(meth)acrylate, and 1,6-hexanediol di(meth)acrylate may also be used. These radical polyemerizable unsaturated monomers may be used alone or in combination. In addition, among them, styrene is preferred from the viewpoint of workability, cost, and curing properties.

The content of the radical polymerizable unsaturated monomer in the vinyl ester resin (A) is preferably 10 to 50% by weight, and more preferably 30 to 50% by weight. When the content of the radical polymerizable unsaturated monomer is lower than 10% by weight, the workability may decrease due to an increase in the resin viscosity. Thus, such a content is not preferable. In contrast, when the content of the radical polymerizable unsaturated monomer exceeds 50% by weight, desired toughness of a cured product may not be obtained. Thus, such a content is also not preferable.

It should be noted that the radical polymerizable unsaturated monomer may be blended as a solvent from the viewpoint of adjusting the viscosity and the like of the radical polymerizable resin composition. In this case, the blending amount of the radical polymerizable unsaturated monomer may be appropriately adjusted in accordance with the components of the radical polymerizable resin composition to be used.

The urethane (meth)acrylic resin (B) used in the present invention is a resin obtained by dissolving a given urethane (meth)acrylate in the radical polymerizable unsaturated monomer.

The urethane (meth)acrylate used as a raw material of the urethane (meth)acrylic resin (B) is obtained by reacting an isocyanate compound having two or more isocyanate groups in one molecule, a (meth)acrylic compound having one or more hydroxy groups in one molecule, and polyethylene glycol.

There is no limitation to the isocyanate compound having two or more isocyanate groups in one molecule, and conventionally known isocyanate compounds can be used. Examples of such isocyanate compounds include diphenylmethane diisocyanate, 2,4-tolylenediisocyanate and isomers thereof, hexamethylene diisocyanate, isophorone diisocyanate, xylylene diisocyanate, and triphenylmethane triisocyanate. These isocyanate compounds can be used alone or in combination. Among these isocyanate compounds, diphenylmethane diisocyanate which has excellent reactivity and is less harmful to the human body is preferable.

The blending amount of the isocyanate compound is preferably 5 to 90 parts by weight, and more preferably 10 to 50 parts by weight, with respect to 100 parts by weight of the total amount of the raw materials of urethane (meth)acrylate. When the blending amount of the isocyanate compound is lower than 5 parts by weight, desired strength may not be obtained. Thus, such a blending amount is not preferable. In contrast, when the blending amount of the isocyanate compound exceeds 90 parts by weight, desired flexibility may not be obtained. Thus, such a blending amount is not preferable.

The (meth)acrylic compound having one or more hydroxy groups in one molecule is not particularly limited, and conventionally known compounds may be used. Examples of the (meth)acrylic compounds that can be used include 2-hydroxyethyl (meth)acrylate, 2-hydroxypropyl (meth)acrylate, 3-hydroxybutyl (meth)acrylate, polyethylene glycol mono (meth)acrylate, polypropylene glycol mono(meth)acrylate, tris(hydroxyethyl)isocyanurate di(meth)acrylate, and pentaerythritol tri(meth)acrylate. These (meth)acrylic compounds may be used alone or in combination. In addition, among these (meth)acrylic compounds, 2-hydroxyethyl (meth)acrylate and 2-hydroxypropyl (meth)acrylate are preferred from the viewpoints of cost and safety.

The blending amount of the (meth)acrylic compound is preferably 5 to 90 parts by weight, and more preferably 10 to 50 parts by weight, with respect to 100 parts by weight of the total amount of raw materials of urethane (meth)acrylate. When the blending amount of the (meth)acrylic compound is lower than 5 parts by weight, desired strength may not be obtained. Thus, such a blending amount is not preferable. In contrast, when the blending amount of the isocyanate compound exceeds 90 parts by weight, desired flexibility may not be obtained. Thus, such a blending amount is not preferable.

There is no limitation to the polyethylene glycol, and polyethylene glycols having a weight average molecular weight of 200 to 2,000, and preferably 400 to 1,500, are preferable. When the weight average molecular weight is lower than 200, desired viscosity and physical properties may not be obtained in the resin composition. In contrast, when the weight average molecular weight exceeds 2,000, the molecular weight of a urethane (meth)acrylic resin exceeds 7,000, resulting in that desired compatibility with a vinyl ester resin may not be obtained.

The blending amount of polyethylene glycol is preferably 0.1 to 90 parts by weight, and more preferably 5 to 50 parts by weight, with respect to 100 parts by weight of the total amount of raw materials of urethane (meth)acrylate. When the blending amount of polyethylene glycol is lower than 0.1 part by weight, desired compatibility may not be obtained. Thus, such a blending amount is not preferable. In contrast, when the blending amount of polyethylene glycol exceeds 90 parts by weight, desired water resistant properties may not be obtained. Thus, such a blending amount is not preferable.

In the production of a urethane (meth)acrylate, it is possible to add, as an optional component, polyether polyol and/or adipate polyester polyol.

There is no limitation to the polyether polyol, and polyether polyols having a weight average molecular weight of 500 to 1,500, and preferably 800 to 1,200, are preferable. When the weight average molecular weight is lower than 500, desired viscosity and physical properties may not be obtained in the resin composition. In contrast, when the weight average molecular weight exceeds 1,500, the molecular weight of a urethane (meth)acrylic resin exceeds 7,000, resulting in that desired compatibility with a vinyl ester resin may not be obtained.

When blending polyether polyol, the blending amount thereof is preferably 5 to 90 parts by weight, and more preferably 20 to 60 parts by weight, with respect to 100 parts by weight of the total amount of raw materials of urethane (meth) acrylate. When the blending amount of polyether polyol is lower than 5 parts by weight, desired flexibility may not be obtained. Thus, such a blending amount is not preferable. In contrast, when the blending amount of polyether polyol exceeds 90 parts by weight, desired compatibility may not be obtained. Thus, such a blending amount is not preferable.

There is no limitation to the adipate polyester polyol, and adipate polyester polyols having a weight average molecular weight of 600 to 3,000, and preferably 800 to 2,500, are preferable. When the weight average molecular weight is lower than 600, the desired viscosity and physical properties may not be obtained in the resin composition. In contrast, when the weight average molecular weight exceeds 3,000, the molecular weight of a urethane (meth)acrylic resin exceeds 7,000, resulting in that desired compatibility with a vinyl ester resin may not be obtained.

When blending adipate polyester polyol, the blending amount thereof is preferably 0.1 to 90 parts by weight, and more preferably 5 to 50 parts by weight, with respect to 100 parts by weight of the total amount of raw materials of urethane (meth)acrylate. When the blending amount of adipate polyester polyol is lower than 0.1 part by weight, desired compatibility may not be obtained. Thus, such a blending amount is not preferable. In contrast, when the blending amount of adipate polyester polyol exceeds 90 parts by weight, desired water resistant properties may not be obtained. Thus, such a blending amount is not preferable.

The production method of the urethane (meth)acrylate is not particularly limited, and the urethane (meth)acrylate can be produced by known methods using the above-mentioned ingredients. For example, the urethane (meth)acrylate can be produced by mixing a isocyanate compound having two or more isocyanate groups in one molecule and polyethylene glycol and reacting them to generate a terminal isocyanate-containing prepolymer, and subsequently adding the (meth) acrylic compound having one or more hydroxy groups in one molecule to the prepolymer for reaction. It should be noted that, in the above-mentioned reaction, it is also possible to add catalysts such as dibutyltin dilaurate, tertiary amines, and phosphones. When the catalyst is added, the blending amount of the catalyst is preferably 0.0001 to 1 part by weight, and more preferably 0.001 to 0.5 part by weight with respect to 100 parts by weight of the total amount of raw materials of the urethane (meth)acrylate. When the blending amount of the catalyst is lower than 0.0001 part by weight, the reaction may not sufficiently proceed. Thus, such a blending amount is not preferable. In contrast, when the blending amount of the catalyst exceeds 1 part by weight, it may become difficult to control the reaction. Thus, such a blending amount is also not preferable.

In the reaction, the reaction temperature is preferably 40 to 120° C. The reaction time is preferably 1 to 24 hours. When the reaction temperature is lower than 40° C. or the reaction time is lower than 1 hour, the reaction does not sufficiently proceed, and the desired urethane (meth)acrylate may not be obtained. Thus, such a reaction temperature or reaction time is not preferable. In contrast, when the reaction temperature exceeds 120° C. or the reaction time exceeds 24 hours, undesirable results may occur in terms of cost or reaction control.

There is no limitation to the radical polymerizable unsaturated monomer used as a raw material for the urethane (meth)acrylic resin (B), and conventionally known radical polymerizable unsaturated monomers can be used. Examples of the radical polymerizable unsaturated monomers are the same as those in the vinyl ester resin (A) mentioned above.

The content of the radical polymerizable unsaturated monomer in the urethane (meth)acrylic resin (B) is preferably 10 to 50% by weight, and more preferably 30 to 50% by weight. When the content of the radical polymerizable unsaturated monomer is lower than 10% by weight, the workability may decrease due to the increase in the resin viscosity. Thus, such a content is not preferable. In contrast, when the content of the radical polymerizable unsaturated monomer exceeds 50% by weight, the desired toughness of the cured product may not be obtained. Thus, such a content is not preferable.

The urethane (meth)acrylic resin (B) thus obtained has a weight average molecular weight of preferably 2,000 to 8,000, more preferably 2,500 to 7,000, and still more preferably 3,000 to 6,500. In the case that the urethane (meth) acrylic resin (B) has a weight average molecular weight in the above-mentioned range, the resin has excellent compatibility with the vinyl ester resin (A). Therefore, when a resin composition is produced using the resin, the urethane (meth) acrylic resin (B) is not microphase separated in the vinyl ester resin (A) at the time of curing. Therefore, such a resin composition provides a transparent cured product.

The weight ratio of the vinyl ester resin (A) to the urethane (meth)acrylic resin (B) is preferably 20:80 to 80:20 and more preferably 30:70 to 70:30. When the weight ratio of the vinyl ester resin (A) to the urethane (meth)acrylic resin (B) is excessively low, strength sufficient for practical use may not be obtained. In contrast, when the weight ratio of the vinyl ester resin (A) to the urethane (meth)acrylic resin (B) is excessively high, desired toughness may not be obtained.

The aliphatic amine (C) used in the present invention has the following general formula.

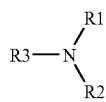

In the general formula, R1 represents a hydroxyalkyl group, R2 represents an alkyl group or a hydroxyalkyl group and preferably represents a hydroxyalkyl group, and R3 represents H or $CH_3$. Here, the hydroxyalkyl group represented by R1 and the alkyl group or the hydroxyalkyl group represented by R2 each preferably has 1 to 20 carbon atoms. The hydroxyalkyl groups represented by R1 and R2 each preferably have 1 to 5 hydroxy groups in one molecule.

Examples of the aliphatic amine (C) include N-ethylethanolamine, N,N-diethylethanolamine, N-diethanolamine, N-methylethanolamine, N-dimethylethanolamine, N-methyldiethanolamine, N,n-butylethanolamine, N,N-dibutylethanolamine, N-butyldiethanolamine, N-t-butylethanolamine, N-t-butyldiethanolamine, N-(β-aminoethyl)ethanolamine, N-(β-aminoethyl)isopropanolamine, and N,N-diethylisopropanolamine. Among them, N-diethanolamine and N-methyldiethanolamine are preferred. In addition, these aliphatic amines may be used alone or in combination.

The blending amount of the aliphatic amine (C) is preferably 0.02 to 10 parts by weight and more preferably 0.1 to 5 parts by weight with respect to 100 parts by weight of the total amount of the vinyl ester resin (A) and the urethane (meth) acrylic resin (B). When the blending amount of the aliphatic amine (C) is less than 0.02 part by weight, drying properties may become poor. In contrast, when the blending amount of the aliphatic amine (C) exceeds 10 parts by weight, storage stability lowers and cost increases.

The metal soap of cobalt can be added (D) to the present invention from the viewpoints of promoting the curing and imparting drying properties. The metal soap of cobalt (D) is not particularly limited, and conventionally known organic cobalt salts can be used. Examples of the metal soap of cobalt (D) include cobalt octylate, cobalt naphthenate, and cobalt hydroxide. Among them, cobalt naphthenate and cobalt octylate are preferable. The metal soap of cobalt can be used alone or in combination.

The blending amount of the metal soap of cobalt (D) is preferably 0.02 to 10 parts by weight, and more preferably 0.1 to 3.0 parts by weight, with respect to 100 parts by weight of the total amount of the vinyl ester resin (A) and the urethane (meth)acrylic resin (B). When the blending amount of the metal soap of cobalt (D) is lower than 0.02 part by weight, the desired curing time period and desired cured state are not obtained, possibly resulting in poor drying. In contrast, when the blending amount of the metal soap of cobalt (D) exceeds 10 parts by weight, the desired pot life and desired storage stability may not be obtained.

The organic peroxide (E) used in the present invention is a radical polymerization initiator. There is no limitation to the organic peroxide (E), and conventionally known organic peroxides can be used. Examples of the organic peroxide (E) include ketone peroxide, perbenzoate, hydroperoxide, diacylperoxide, peroxyketal, hydroperoxide, diallylperoxide, peroxy ester, and peroxy dicarbonate. Azo compounds and the like can also be used. More specifically, methylethyl ketone peroxide, cumene hydroperoxide, t-butylperbenzoate, benzoylperoxide, dicumylperoxide, diisopropyl peroxide, di-t-butyl peroxide, t-butyl peroxybenzoate, 1,1-bis(t-butylperoxy)-3,3,5-trimethyl cyclohexane, 2,5-dimethyl-2,5-bis(t-butylperoxy)hexyne-3,3-isopropylhydroperoxide, t-butylhydroperoxide, dicumylhydroperoxide, acetylperoxide, bis(4-t-butylcyclohexyl)peroxy dicarbonate, diisopropylperoxy dicarbonate, isobutylperoxide, 3,3,5-trimethylhexanoyl peroxide, lauryl peroxide, azobisisobutyronitrile, azobiscarboneamide, or the like may be used. These organic peroxides may be used alone or in combination. In addition, among them, ketone peroxide, t-butylperbenzoate, benzoylperoxide, and cumene hydroperoxide are preferred from the viewpoints of cost, ease of availability, and stability.

The blending amount of the organic peroxide (E) is preferably 0.1 to 7 parts by weight, and more preferably 0.5 to 5 parts by weight, with respect to 100 parts by weight of the total amount of the vinyl ester resin (A) and the urethane (meth)acrylic resin (B). When the blending amount of the organic peroxide is lower than 0.1 part by weight, desired curing properties may not be obtained. In contrast, the blending amount of the organic peroxide exceeding 7 parts by weight is economically disadvantageous and the desired physical properties in the cured product may not be achieved.

To the radical polymerizable resin composition of the present invention, there may be blended: a silane coupling agent and a wetting agent for improving the adhesiveness with the glass fiber reinforcing material (F); a mold release agent component such as zinc stearate for improving the mold-release properties; and a paraffin wax and an organic manganese salt for further improving the drying properties and the properties of a cured product.

The radical polymerizable resin composition of the present invention may be produced by mixing the above components. In the production thereof, the mixing method is not particularly limited, and conventionally known methods can be used.

The glass fiber reinforcing material (F) to be used in the present invention is not particularly limited and conventionally known materials can be used. Examples of the glass fiber reinforcing material (F) include a chopped strand mat, a roving, and a roving cloth.

The blending amount of the glass fiber reinforcing material (F) is preferably 10 to 500 parts by weight and more preferably 30 to 400 parts by weight with respect to 100 parts by weight of the radical polymerizable resin composition. When the blending amount of the glass fiber reinforcing material (F) is less than 10 parts by weight, desired strength may not be obtained. In contrast, when the blending amount of the glass fiber reinforcing material (F) exceeds 500 parts by weight, impact resistance may be lowered.

The fiber reinforced plastic molding material of the present invention may be easily produced using a radical polymerizable resin composition containing the components (A) to (E) and the glass fiber reinforcing material (F) by a conventionally known method. For example, a sheet molding compound (SMC) may be obtained by impregnating the glass fiber reinforcing material (F) in a mat form with the radical polymerizable resin composition.

The fiber reinforced plastic molded article of the present invention may be produced by molding the fiber reinforced plastic molding material into a desired shape and then curing the resultant. The molding method is not particularly limited, and known methods can be used, such as matched metal die (MMD) molding, transfer molding, and injection molding.

EXAMPLES

Hereinafter, the present invention is described in more detail with reference to examples, but the invention is not limited to the examples alone.

[Preparation of Vinyl Ester Resin (A)]

In a reactor equipped with a stirrer, a reflux condenser, a gas introducing pipe, and a thermometer, 1,890 g of Epikote 828 (epoxy resin manufactured by Yuka-Shell Epoxy Co., Ltd.: epoxy equivalent=189), 570 g of bisphenol A, and 12.3 g of benzyl triphenyl ammonium chloride were placed. The mixture was reacted at 150° C. for 2 hours under a nitrogen atmosphere. After the termination of the reaction, the resultant was cooled to 90° C. Then, to the reactant, 430 g of methacrylic acid, 9 g of tetradecyl dimethyl benzyl ammonium chloride, 0.9 g of hydroquinone, and 1,000 g of styrene were added. The mixture was further reacted at 90° C. for 20 hours while blowing air. Then, the reaction was terminated when the acid number reached 10 mgKOH/g to thereby obtain vinyl ester. Subsequently, to the vinyl ester, 710 g of styrene was added to obtain a bisphenol A vinyl ester resin (VE-1) having a viscosity at 25° C. of 1.5 Pa·s and a solid content of 63% by weight. The weight average molecular weight of VE-1 was 4,200. Here, the weight average molecular weight was measured using Shodex GPC system-21. It should be noted that the measurement of the weight average molecular weight in Synthesis Examples and Comparative Synthesis Examples described below was performed using the same apparatus.

Preparation of Urethane (Meth)Acrylic Resin (B)

Synthesis Example 1

In a 3 L four-necked flask equipped with a stirrer, a reflux condenser tube, a gas introducing pipe, and a thermometer, 500 g of diphenylmethane diisocyanate, 700 g of Actcol P-22 (polyether polyol manufactured by MITSUI TAKEDA CHEMICAL, INC.: weight average molecular weight=1,000), 180 g of TOHO polyethylene glycol #600 (polyethylene glycol manufactured by TOHO Chemical Industry Co., Ltd.: weight average molecular weight=600), and 0.2 g of dibutyltin dilaurate were placed. The mixture was reacted while being stirred at 60° C. for 4 hours. Subsequently, the reactant was stirred while 260 g of 2-hydroxyethyl methacrylate were added dropwise over 2 hours. After the completion of the dropwise addition, the resultant was reacted by stirring for 5 hours to obtain urethane methacrylate. Subsequently, to the urethane methacrylate, 702 g of styrene monomer was added to obtain a urethane methacrylate resin (U-1). The weight average molecular weight of the urethane methacrylate resin (U-1) was 5,315.

Synthesis Example 2

In a 3 L four-necked flask equipped with a stirrer, a reflux condenser tube, a gas introducing pipe, and a thermometer, 500 g of diphenylmethane diisocyanate, 500 g of Actcol P-22 (polyether polyol manufactured by MITSUI TAKEDA CHEMICAL, INC.: weight average molecular weight=1,000), 60 g of TOHO polyethylene glycol #600 (polyethylene glycol manufactured by TOHO Chemical Industry Co., Ltd.: weight average molecular weight=600), 400 g of Kuraray polyol P-1010 (adipate polyester polyol manufactured by Kuraray Co., Ltd.: weight average molecular weight=1,000), and 0.15 g of dibutyltin dilaurate were placed. The mixture was reacted while being stirred at 60° C. for 4 hours. Subsequently, the reactant was stirred while 260 g of 2-hydroxyethyl methacrylate were added dropwise over 2 hours. After the completion of the dropwise addition, the resultant was reacted by stirring for 5 hours to obtain urethane methacrylate. Subsequently, to the urethane methacrylate, 737 g of styrene monomer was added to obtain a urethane methacrylate resin (U-2). The weight average molecular weight of the urethane methacrylate resin (U-2) was 5,821.

Synthesis Example 3

In a 3 L four-necked flask equipped with a stirrer, a reflux condenser tube, a gas introducing pipe, and a thermometer, 500 g of diphenylmethane diisocyanate, 800 g of Actcol P-22 (polyether polyol manufactured by MITSUI TAKEDA CHEMICAL, INC.: weight average molecular weight=1,000), 90 g of TOHO polyethylene glycol #600 (polyethylene glycol manufactured by TOHO Chemical Industry Co., Ltd.: weight average molecular weight=600), 100 g of Kuraray polyol P-2010 (adipate polyester polyol manufactured by Kuraray Co., Ltd.: weight average molecular weight=2,000), and 0.15 g dibutyltin dilaurate were placed. The mixture was reacted while being stirred at 60° C. for 4 hours. Subsequently, the reactant was stirred while 260 g of 2-hydroxyethyl methacrylate were added dropwise over 2 hours. After the completion of the dropwise addition, the resultant was reacted by stirring for 5 hours to obtain urethane methacrylate. Subsequently, to the urethane methacrylate, 750 g of styrene monomer was added to obtain a urethane methacrylate resin (U-3). The weight average molecular weight of the urethane methacrylate resin (U-3) was 6,890.

Synthesis Example 4

In a 3 L four-necked flask equipped with a stirrer, a reflux condenser tube, a gas introducing pipe, and a thermometer, 500 g of diphenylmethane diisocyanate, 600 g of TOHO polyethylene glycol #600 (polyethylene glycol manufactured by TOHO Chemical Industry Co., Ltd.: weight average molecular weight=600), and 0.1 g of dibutyltin dilaurate were placed. The mixture was reacted while being stirred at 60° C. for 4 hours. Subsequently, the reactant was stirred while 260 g of 2-hydroxyethyl methacrylate were added dropwise over 2 hours. After the completion of the dropwise addition, the resultant was reacted by stirring for 5 hours to obtain urethane methacrylate. Subsequently, to the urethane methacrylate, 582 g of styrene monomer was added to obtain a urethane methacrylate resin (U-4). The weight average molecular weight of the urethane methacrylate resin (U-4) was 3,902.

Comparative Synthesis Example 1

In Comparative Synthesis Example 1, a urethane methacrylate resin was prepared without using polyethylene glycol.

In a 3 L four-necked flask equipped with a stirrer, a reflux condenser tube, a gas introducing pipe, and a thermometer, 500 g of diphenylmethane diisocyanate, 1,000 g of Actcol P-22 (polyether polyol manufactured by MITSUI TAKEDA CHEMICAL, INC.: weight average molecular weight=1,000), and 0.15 g of dibutyltin dilaurate were placed. The mixture was reacted while being stirred at 60° C. for 4 hours. Subsequently, the reactant was stirred while 260 g of 2-hydroxyethyl methacrylate were added dropwise over 2 hours. After the completion of the dropwise addition, the resultant was reacted by stirring for 5 hours to obtain urethane methacrylate. Subsequently, to the urethane methacrylate, 1,170 g of styrene monomer was added to obtain a urethane methacrylate resin (U-5). The weight average molecular weight of the urethane methacrylate resin (U-5) was 5,918.

Comparative Synthesis Example 2

In Comparative Synthesis Example 2, a urethane methacrylate resin was prepared by using propylene glycol in place of polyethylene glycol.

In a 3 L four-necked flask equipped with a stirrer, a reflux condenser tube, a gas introducing pipe, and a thermometer, 500 g of diphenylmethane diisocyanate, 76 g of propylene glycol, and 0.5 g of dibutyltin dilaurate were placed. The mixture was reacted while being stirred at 60° C. for 4 hours. Subsequently, the reactant was stirred while 260 g of 2-hydroxyethyl methacrylate was added dropwise over 2 hours. After the completion of the dropwise addition, the resultant was reacted by stirring for 5 hours to obtain urethane methacrylate. Subsequently, to the urethane methacrylate, 560 g of styrene monomer was added to obtain a urethane methacrylate resin (U-6). The weight average molecular weight of the urethane methacrylate resin (U-6) was 1,403.

Comparative Synthesis Example 3

In Comparative Synthesis Example 3, a urethane methacrylate resin was prepared in the same manner as in Comparative Synthesis Example 1 without using polyethylene glycol.

In a 3 L four-necked flask equipped with a stirrer, a reflux condenser tube, a gas introducing pipe, and a thermometer, 500 g of diphenylmethane diisocyanate, 700 g of Actcol P-22 (polyether polyol manufactured by MITSUI TAKEDA CHEMICAL, INC.: weight average molecular weight=1,000), 300 g of Kuraray polyol C-1090 (carbonate polyester polyol manufactured by Kuraray Co., Ltd.: weight average molecular weight=1,000), and 0.2 g of dibutyltin dilaurate were placed. The mixture was reacted while being stirred at 60° C. for 4 hours. Subsequently, the reactant was stirred while 260 g of 2-hydroxyethyl methacrylate was added dropwise over 2 hours. After the completion of the dropwise addition, the resultant was reacted by stirring for 5 hours to obtain urethane methacrylate. Subsequently, to the urethane methacrylate, 754 g of styrene monomer was added to obtain a urethane methacrylate resin (U-7). The weight average molecular weight of the urethane methacrylate resin (U-7) was 6,473.

Preparation of Fiber Reinforced Plastic Molding Material and Fiber Reinforced Plastic Molded Article Examples 1 to 5 and Comparative Examples 1 to 3

Each of radical polymerizable resin compositions was prepared by mixing the components (A) to (E) and a solvent, using the components in the proportions shown in Table 1. Next, a glass fiber reinforcing material (F) (about 3 mm in thickness), formed from a laminate of a #450 chopped strand mat (3 plies) and a surface mat (1 ply), was impregnated with the radical polymerizable resin composition, and the resultant was left standing for 1 day to be cured at standard room temperature. As a result, a fiber reinforced plastic molding material was obtained. The fiber reinforced plastic molding material was then postcured at 120° C. for 2 hours, and as a result, a fiber reinforced plastic molded article was obtained. It should be noted that, for the following evaluations, samples obtained by cutting the thus obtained fiber reinforced plastic molded article were used.

Each evaluation was performed following the procedures described below.

[Hue]

The hue of each of the radical polymerizable resin compositions used in examples and comparative examples was evaluated using Gardner's method. In Table 1, "◯" represents Gardner 1 or less and "X" represents Gardner 1 or more or purple.

Further, the hue of the cured product of the radical polymerizable resin composition was evaluated by visual observation. In Table 1, "◯" represents "not colored" and "X" represents "colored".

[Impact Resistance]

The impact resistance (Izod impact value) of the fiber reinforced plastic molded article was measured according to JIS K 6911 (A general method for testing thermosetting plastics).

[Tensile Strength]

The tensile strength of the fiber reinforced plastic molded article was measured according to JIS K 7054 (A method for testing the tensile properties of glass fiber reinforced plastics).

[Flexural Strength]

The flexural strength of the fiber reinforced plastic molded article was measured according to JIS K 7171 (A method of testing for flexural properties).

The evaluation results are shown in Table 1.

TABLE 1

|  |  | Ex. 1 | Ex. 2 | Ex. 3 | Ex. 4 | Ex. 5 | Co-Ex. 1 | Co-Ex. 2 | Co-Ex. 3 |
|---|---|---|---|---|---|---|---|---|---|
| Component (A) | VE-1 | 50 | 50 | 50 | 50 | 60 | 70 | 60 | 50 |
| Component (B) | U-1 | 38 | — | — | — | 40 | — | — | — |
|  | U-2 | — | 38 | — | — | — | — | — | — |
|  | U-3 | — | — | 38 | — | — | — | — | — |
|  | U-4 | — | — | — | 38 | — | — | — | — |
|  | U-5 | — | — | — | — | — | 30 | — | — |
|  | U-6 | — | — | — | — | — | — | 40 | — |
|  | U-7 | — | — | — | — | — | — | — | 38 |
| Component (C) | N,N-diethanolamine | 0.2 | 0.2 | 0.2 | 0.2 | 0.2 | — | — | — |
| Component (D) | Cobalt octylate | 0.1 | 0.1 | 0.1 | 0.1 | 0.1 | 0.1 | 0.1 | 0.1 |
| Component (E) | Methyl ethyl ketone peroxide[1] | 1.6 | 1.6 | 1.6 | 1.6 | 1.6 | 1.6 | 1.6 | 1.6 |
|  | T-butyl perbenzoate[2] | 0.4 | 0.4 | 0.4 | 0.4 | 0.4 | 0.4 | 0.4 | 0.4 |
| Solvent | Methyl methacrylate | 12 | 12 | 12 | 12 | 12 | — | — | 12 |
| Component (F) | Surface mat and chopped strand mat (#450) | 50 | 50 | 50 | 50 | 50 | 5 | 50 | 50 |
| Hue of radical polymerizable resin composition |  | ◯ | ◯ | ◯ | ◯ | ◯ | X | X | X |
| Hue of cured product |  | ◯ | ◯ | ◯ | ◯ | ◯ | X | X | X |

TABLE 1-continued

|  | Ex. 1 | Ex. 2 | Ex. 3 | Ex. 4 | Ex. 5 | Co-Ex. 1 | Co-Ex. 2 | Co-Ex. 3 |
|---|---|---|---|---|---|---|---|---|
| Tensile strength (MPa) | 120 | 123 | 128 | 118 | 130 | 80 | 100 | 110 |
| Flexural strength (MPa) | 170 | 175 | 178 | 170 | 182 | 130 | 130 | 128 |
| Izod impact value (KJ/mm$^2$) | 53 | 55 | 52 | 59 | 53 | 40 | 38 | 45 |

[1)]Kayamek M [manufactured by Kayaku Akzo Corporation]
[2)]Kayabutyl B [manufactured by Kayaku Akzo Corporation]

As shown in Table 1, each of the radical polymerizable resin compositions of Examples 1 to 5 used for a fiber reinforced plastic molding material and each of the cured products thereof were not colored. On the other hand, each of the radical polymerizable resin compositions of Comparative Examples 1 to 3 used to produce the fiber reinforced plastic molding material and each of the cured products thereof were all colored.

Further, the fiber reinforced plastic molded articles of Examples 1 to 5 each had higher Izod impact value, tensile strength, and flexural strength compared with the fiber reinforced plastic molded articles of Comparative Examples 1 to 3.

As is shown from the results described above, the fiber reinforced plastic molding material of the present invention can provide a cured product (fiber reinforced plastic molded article) with excellent impact resistance, corrosion resistance and transparency.

The invention claimed is:

1. A fiber reinforced plastic molding material, comprising:
a radical polymerizable resin composition containing:
a vinyl ester resin (A) having a weight average molecular weight of 500 to 6,000;
a urethane (meth)acrylic resin (B) obtained by reacting an isocyanate compound having two or more isocyanate groups in one molecule, a (meth)acrylic compound having one or more hydroxy groups in one molecule, and polyethylene glycol;
an aliphatic amine (C) represented by the following general formula:

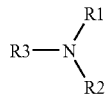

where R1 represents a hydroxyalkyl group, R2 represents an alkyl group or a hydroxyalkyl group, and R3 represents H or CH$_3$;
a metal soap of cobalt (D); and
an organic peroxide (E); and
a glass fiber reinforcing material (F),
wherein a weight average molecular weight of the urethane (meth)acrylic resin (B) is 2,000 to 7,000; and
wherein a weight ratio of the vinyl ester resin (A) to the urethane (meth)acrylic resin (B) is 20:80 to 80:20.

2. A fiber reinforced plastic molding material according to claim 1, wherein the urethane (meth)acrylic resin (B) is obtained by reacting an isocyanate compound having two or more isocyanate groups in one molecule, a (meth)acrylic compound having one or more hydroxy groups, polyethylene glycol, and polyether polyol and/or adipate polyester polyol.

3. A fiber reinforced plastic molding material according to claim 1, wherein the isocyanate compound having two or more isocyanate groups in one molecule is diphenylmethane diisocyanate.

4. A fiber reinforced plastic molding material according to claim 1, wherein the (meth)acrylic compound having one or more hydroxy groups in one molecule is 2-hydroxyethyl (meth)acrylate, 2-hydroxypropyl (meth)acrylate, or a mixture thereof.

5. A fiber reinforced plastic molding material according to claim 1, wherein the vinyl ester resin (A) is a bisphenol vinyl ester resin, a novolac vinyl ester resin, a brominated vinyl ester resin, or a mixture thereof 6. A fiber reinforced plastic molding material according to claim 1, wherein the vinyl ester resin (A) and the urethane (meth)acrylic resin (B) contain 10 to 50% by weight of styrene.

7. A fiber reinforced plastic molding material according to claim 1, wherein R2 of the component (C) represented by the general formula is a hydroxyalkyl group, and a content of the component (C) is 0.02 to 10 parts by weight with respect to 100 parts by weight of a total amount the component (A) and the component (B).

8. A fiber reinforced plastic molded article, which is formed by curing the fiber reinforced plastic molding material according to claim 1.

* * * * *